United States Patent [19]

Stedman

[11] 4,066,119
[45] Jan. 3, 1978

[54] ROTATABLE RADIATOR ASSEMBLY FOR A VEHICLE

[75] Inventor: Robert N. Stedman, Chillicothe, Ill.

[73] Assignee: Caterpillar Tractor Co., Peoria, Ill.

[21] Appl. No.: 718,733

[22] Filed: Aug. 30, 1976

[51] Int. Cl.² .................. F28F 13/06; F01P 3/00; B60K 11/02; F28F 9/00
[52] U.S. Cl. ................. 165/41; 123/41.43; 165/51; 165/67; 165/86; 165/97; 165/137; 180/68 R
[58] Field of Search ............ 165/51, 67, 97, 95, 165/86, 137, 41; 180/54 A, 68 R; 123/41.43

[56] References Cited

U.S. PATENT DOCUMENTS

| | | | |
|---|---|---|---|
| 1,844,308 | 2/1932 | Armacost | 165/86 |
| 1,856,924 | 5/1932 | Modine | 165/67 |
| 2,095,058 | 10/1937 | Cross | 180/68 R |
| 2,188,245 | 1/1940 | Middleton | 165/137 |
| 2,310,086 | 2/1943 | Howard | 165/86 |
| 2,717,766 | 9/1955 | Becker | 165/137 |
| 2,919,114 | 12/1959 | Ljungstrom | 165/97 |
| 3,048,375 | 8/1962 | Walker | 165/86 |
| 3,071,186 | 1/1963 | Zonker | 165/67 |
| 3,219,104 | 11/1965 | Walker | 165/86 |
| 3,297,080 | 1/1967 | Williams et al. | 165/77 |
| 3,334,704 | 8/1967 | Gehrke et al. | 123/41.43 |
| 3,344,854 | 10/1967 | Boyajian | 165/95 |

*Primary Examiner*—Charles J. Myhre
*Assistant Examiner*—Sheldon Richter
*Attorney, Agent, or Firm*—Frank L. Hart

[57] ABSTRACT

A vehicle engine radiator assembly has a radiator having first and second opposed surfaces, an inlet conduit, and an outlet conduit. A fluid coupling is connected to each conduit and is of a construction sufficient for pivotal movement of the radiator for controllably directing either the first or second surface outwardly from the vehicle. Means is provided for permitting pivotal movement of the radiator and maintaining the radiator fixed to the vehicle at a preselected position. The radiator is pivoted for changing the direction of air flow therethrough for removing dirt and other materials from the radiator.

6 Claims, 3 Drawing Figures

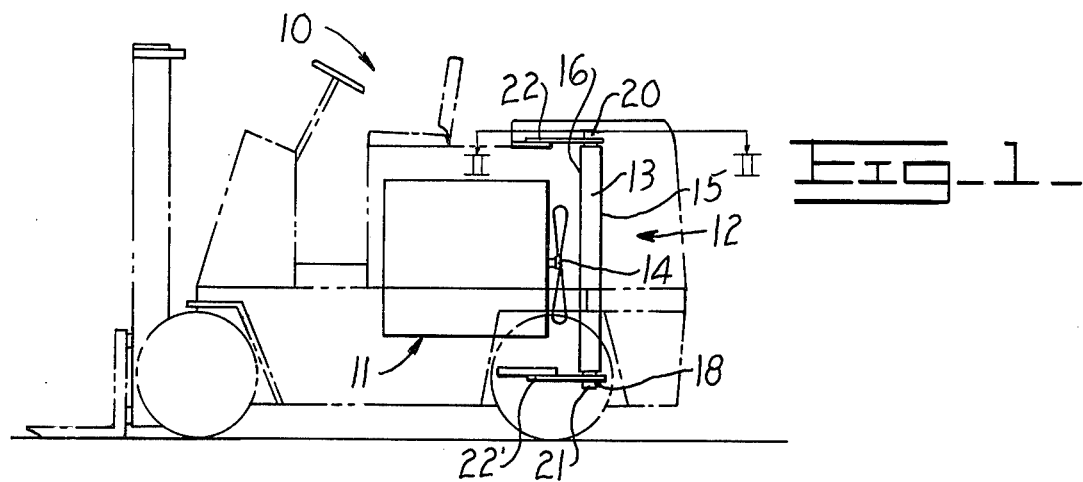
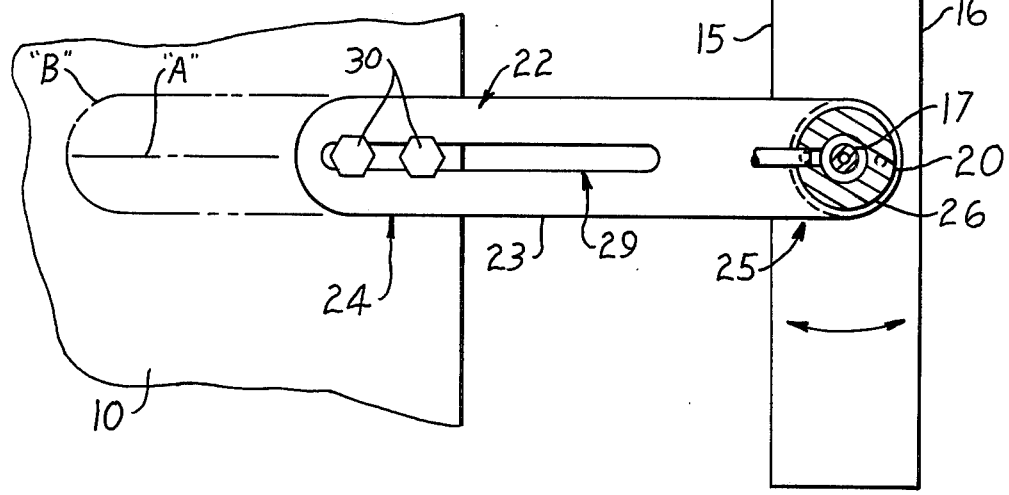
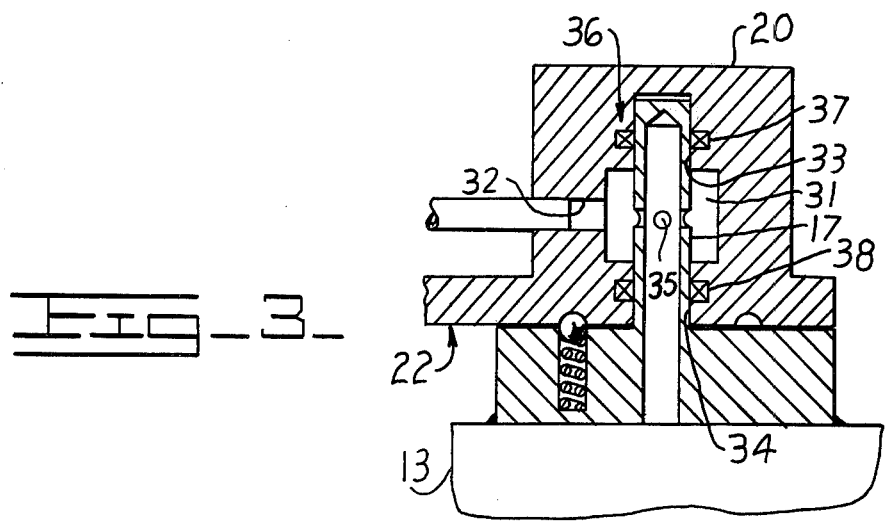

ROTATABLE RADIATOR ASSEMBLY FOR A VEHICLE

BACKGROUND OF THE INVENTION

During operation of a vehicle engine radiator, air flow generally passes in a single direction through the radiator. Eddy currents within the radiator generally permit airborne foreign materials such as greases, dust, and dirt to be deposited on heat exchanger surfaces of the radiator. As these deposited materials increase, the cooling efficiency of the radiator decreases. As is known in the art, the radiators are generally of a construction which causes cleaning of the radiator to be difficult and undesirably time consuming. These undesirable events are particularly pronounced where the vehicle is a work vehicle which operates in extremely dusty conditions.

This invention therefore resides in a radiator assembly which has a rotatable radiator which permits the direction of the passage of air therethrough to be reversed relative to the radiator and functions to remove accumulated foreign material from the radiator.

BRIEF DESCRIPTION OF THE DRAWINGS

FIG. 1 is a diagrammatic side view of a vehicle having the apparatus of this invention;

FIG. 2 is a diagrammatic sectional view taken along line II—II of FIG. 1; and

FIG. 3 is a diagrammatic sectional view of a fluid coupling of the invention.

DETAILED DESCRIPTION OF THE INVENTION

Referring to FIG. 1, a vehicle 10 has an engine 11, and a radiator assembly 12 having a radiator 13 for cooling fluids from the engine 11 by moving air through the radiator 13 by a fan 14. As is further known in the art, the radiator 13 has first and second opposed surfaces 15, 16, an inlet conduit 17 for receiving fluid from the engine 11 and passing fluid to the radiator 13, an outlet conduit 18 for returning fluid from the radiator 13 to the engine, and a tortuous fluid pathway (not shown) for passing fluid from the inlet conduit 17 to the outlet conduit 18 while passing air by the fan 14 from one surface 15, through the radiator 13 and to the other surface 16 (FIG. 3). It should be understood that by use of the word radiator herein, it is intended to cover any type of heat exchanger.

A first fluid coupling 20 is pivotally connected to the inlet conduit 17 and is of a construction sufficient for passing fluid into the radiator 13, as hereinafter more fully described, at a first position at which the first surface 15 of the radiator 13 is directed outwardly from the vehicle 10 and at a second position, as shown in FIG. 2, at which the second surface 16 is directed outwardly from the vehicle 10. A second fluid coupling 21 is pivotally connected to the outlet conduit 18 and is of a construction sufficient for passing fluid from the outlet conduit 18 at said first and second positions.

Referring to FIG. 2, first means 22 is provided for maintaining at least one of the fluid couplings 20 fixed to the vehicle 10 and permitting movement of the fluid couplings 20,21 toward and from the vehicle 10 for movement of the surfaces between the first and second positions. In the preferred embodiment of FIG. 1, a first means 22, 22' is associated with each fluid coupling 20,21.

Means 22 can be of like or different structure than means 22'. Preferably, each are of common construction and the construction of only means 22 will be described for purposes of brevity.

The first means 22 comprises an elongated element 23 having an axis "A", a first end portion 24 connected to the vehicle 10, and a second end portion 25 having an opening extending therethrough for receiving the associated fluid coupling 20. The first means 22 and associated fluid coupling 20 can be a unitary element. The elongated element 23 can be of other construction and fixed to the vehicle by other means without departing from this invention.

The first end portion 24 of the elongated element 23 has a slot 29 preferably extending along the axis "A". Second means 30, such as bolts, extend through the slot 29 and are connectable to the vehicle 10 for movably connecting the first means 22 to the vehicle. The first means 22 is movable from a first position, shown by solid lines, at which the radiator 13 can be rotated and a second position, shown by broken lines "B", at which the radiator 13 is closer to the vehicle and at a normal operation position.

Referring to FIG. 3, each fluid coupling has a chamber 31, a fluid passageway 32 communicating with the chamber 31, and adjacent openings 33,34 on opposed sides of the chamber 31. The openings 33,34 are of sizes sufficient for receiving a respective one of the inlet or outlet conduits 17,18.

Each inlet and outlet conduit 17,18 has at least one opening 35 through a sidewall thereof that is positioned at a location in communication with the chamber 31 of the respective fluid coupling 20 in the installed position therethrough.

Means 36, such as O-ring seals 37,38 are provided for maintaining a fluid seal between the fluid coupling 20 and the associated respective conduit 17. Here O-rings 37,38 are positioned in the annulus between the conduit 17 and the fluid coupling 20 each on an opposed side of the chamber 31.

In the operation of the apparatus, after sufficient dirt has accumulated on the radiator 13 to begin detrimentally affecting the efficiency of the radiator, the bolts 30 are loosened, element 23 is moved outwardly from the vehicle 10, the radiator 13 is rotated 180° about the couplings 20,21, and the element 23 and associated radiator is moved back to the original position "B". At this changed orientation of the radiator 13 relative to the engine 11 and fan 14, air flow through the radiator is reversed relative to the original. The forces from the air passing through the radiator in a reverse direction function to displace dirt and other foreign material which have accumulated on radiator 13.

Other aspects, objects, and advantages of this invention can be obtained from a study of the drawings, the disclosure, and the appended claims.

What is claimed is:

1. In a vehicle engine radiator assembly having a radiator having first and second opposed cooling surfaces, an inlet conduit, an outlet conduit, and means for passing fluid from the inlet conduit to the outlet conduit while passing air from one of the cooling surfaces through the radiator and to the other cooling surface, the improvement comprising:

a first fluid coupling pivotally connected to the inlet and being of a construction sufficient for passing fluid into the inlet at a first position of the radiator at which the first cooling surface is directed outwardly from the vehicle and a second position at which the second cooling surface is directed outwardly from the vehicle;

a second fluid coupling pivotally connected to the outlet and being of a construction sufficient for passing fluid from the outlet at said first and second radiator positions; and first means for maintaining at least one of the fluid couplings fixed to the vehicle for movement of fluid couplings toward and from the vehicle for movement of the radiator between the first and second positions while passing fluid through the radiator from the inlet conduit to the outlet conduit.

2. Apparatus, as set forth in claim 1, wherein first means are associated with each first and second fluid couplings.

3. Apparatus, as set forth in claim 1, wherein said first means comprises an elongated element having an axis, a first end portion connected to the vehicle, and a second end portion connected to an associated fluid coupling.

4. Apparatus, as set forth in claim 3, wherein the first end portion of the elongated element has a slot extending along the axis; and second means extending through the slot and being connectable to the vehicle for movably connecting the first means to the vehicle.

5. Apparatus, as set forth in claim 1, wherein each fluid coupling has a chamber, a fluid passageway communicating with the chamber, and adjacent openings on opposed sides of the chamber, said adjacent openings being of sizes sufficient for receiving a respective one of the inlet and outlet conduits, and each inlet and outlet conduit has at least one opening positioned at a location sufficient for communicating with the chamber of the respective fluid coupling in the installed position therethrough, and including:

means for maintaining a fluid seal between the fluid coupling and the associated respective conduit.

6. Apparatus, as set forth in claim 5, wherein the sealing means comprises an O-ring positioned in the annulus between the associated respective conduit and the fluid coupling on opposed sides of the chamber.

* * * * *